Patented Mar. 28, 1939

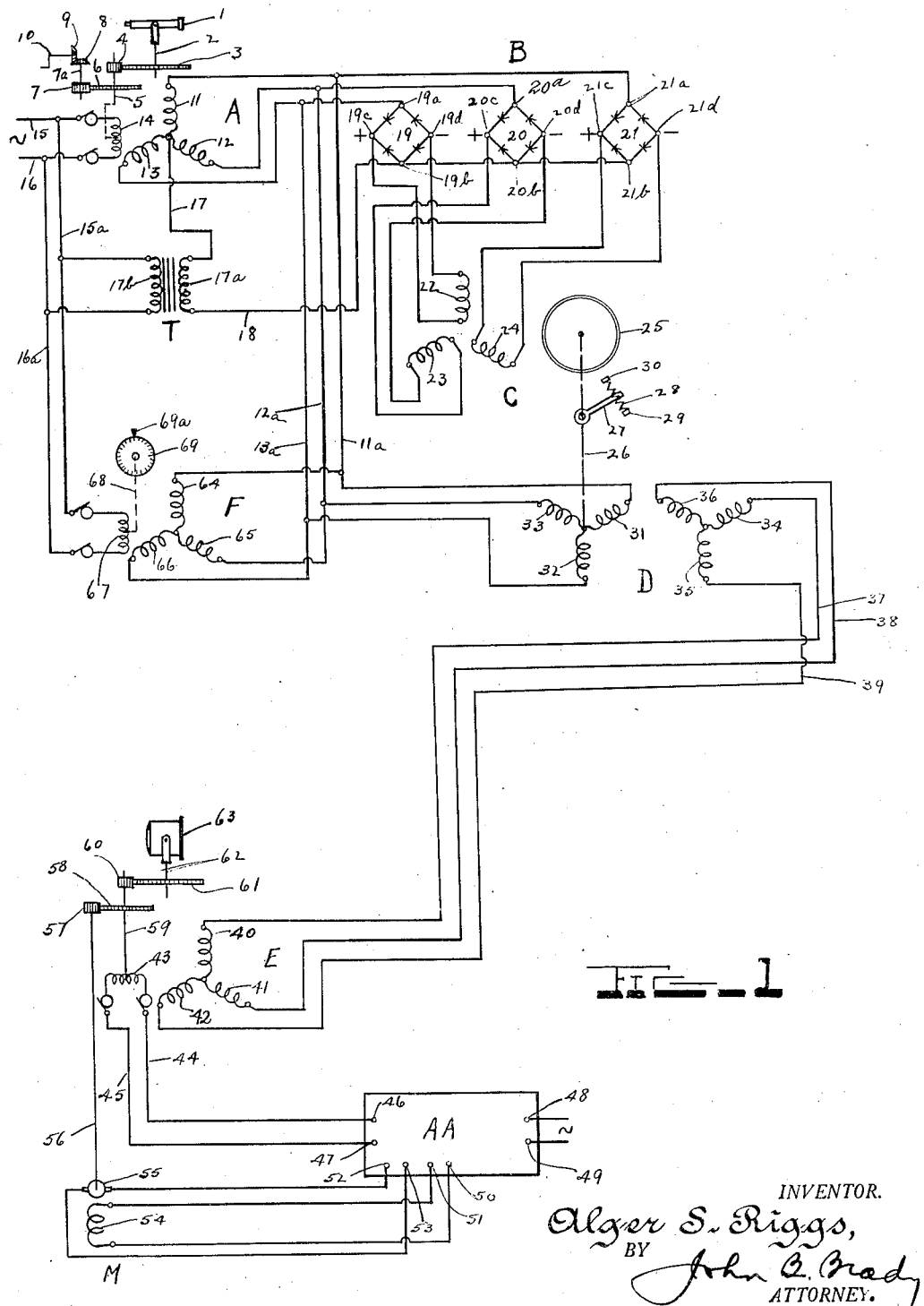

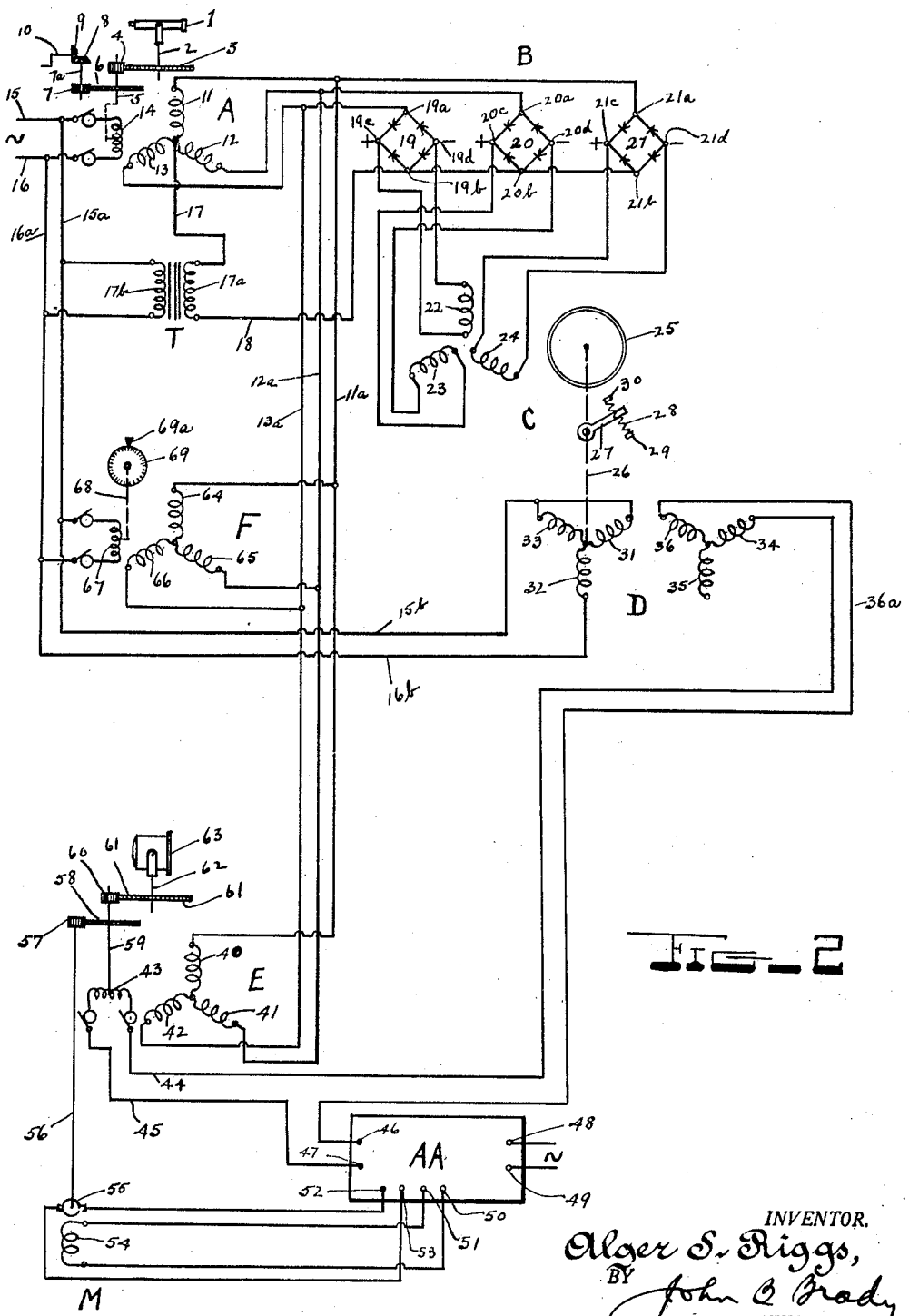

2,151,718

UNITED STATES PATENT OFFICE 2,151,718

ELECTRICAL CONTROL SYSTEM

Alger S. Riggs, Washington, D. C., assignor of one-third to John B. Brady, Washington, D. C.

Application October 10, 1936, Serial No. 105,101

5 Claims. (Cl. 172—239)

My invention relates to angular positional control systems of the general type utilized in connection with "Selsyn" data transmitting systems wherein a heavy object such as a gun or searchlight is positioned angularly in accordance with directions from a telescope or other direction determining device, as for example, in Patent 1,982,350.

One of the objects of my invention is to provide an electrical control system possessing a degree of dynamic accuracy corresponding with the static accuracy.

Another object of my invention is to provide means whereby a heavy object may be positionally controlled from a remote point in such manner that the controlled object is at all times substantially in agreement with the directional transmitter at the remote point regardless of the angular velocity at which the object is following the position of the remote transmitter.

Still another object of my invention is to provide means whereby a follow-up control system may be made more accurate in its positional agreement by the addition of simple and reliable circuits and apparatus which do not require actual connection with the distant means for driving the transmitter.

A further object of my invention is the provision of means for canceling the lag or disagreement between transmitter and receiver in a remote positional control system.

A still further object of my invention is the provision of means for introducing a control component in the system driving the controlled object of such direction and magnitude as to cause the controlled object to run in absolute agreement with the transmitter, while at the same time leaving unaffected the other directional receiving devices which may be operated simultaneously from the transmitter.

Another object of my invention is the provision of simple and reliable means for improving the accuracy of a follow-up system which may be installed in any existing follow-up control system to effect a substantial improvement in its positional accuracy.

In general, follow-up angular positional control systems are characterized by the fact that a disagreement in the angular position between the transmitter and the receiver on the controlled object is necessary to establish a control component for driving the controlled object. They are further characterized by the fact that the angular disagreement or lag is proportional to the speed, or angular velocity, at which the controlled object is following the positional direction of the transmitter.

Since the lag is substantially proportional to the speed, or angular velocity of the system, it is evident that accurate means for producing and introducing a control component in the system driving the controlled object of such direction and magnitude as to equal that normally supplied by disagreement or lag would result in a follow-up control capable of high accuracy of agreement between transmitter and controlled object.

In follow-up control systems used for the control of guns, searchlights and like apparatus, the transmitter operated from a telescope or other directional determining apparatus, simultaneous to controlling the gun or searchlight also controls other apparatus such as "Selsyn" type repeaters. It is therefore desirable that a follow-up control operating from such a transmitter be of such nature as to produce no directional inaccuracy in the other receiving apparatus. Moreover, to eliminate the lag and thus increase follow-up accuracy, the component parts of the follow-up control system which are responsive to transmitter angular velocity should preferably be of such nature as to permit their installation in existing systems without necessitating extensive changes and alterations in the present equipment. Therefore, my invention is directed to the production of means which may be installed on any existing follow-up control system without impairing the existing system while at the same time effecting increased accuracy of the follow-up control.

Other and further objects of my invention will be evident from the following specification by reference to the accompanying drawings, in which:

Figure 1 is a diagrammatic circuit arrangement of a follow-up control system utilizing my invention for the cancellation of lag between transmitter and controlled object wherein the lag is compensated, or eliminated in effect, by the introduction of an angular correction between the telescope or other direction determining apparatus and the object which is being controlled. The angular correction is introduced differentially in proportion to the angular velocity of the telescope or direction controlling apparatus; and Fig. 2 is a diagrammatic circuit arrangement of a follow-up control exactly similar to Fig. 1 except that instead of introducing an angular correction, a signal corresponding thereto is introduced into the control system.

Referring more particularly to Fig. 1, a distant object, here shown as a searchlight 63 is driven by the motor M in angular agreement with a telescope 1. Through the conventional type inductive angular transmitting and receiving devices A and E, the motor is energized through the amplifier AA to drive the searchlight in angular agreement with the telescope.

Through the hand crank 10, gears 9—8, shaft 7a, gears 7—6, shaft 5, gears 4—3, and shaft 2, the telescope 1 is moved in angular position. Simultaneously, the shaft 5 rotates the rotor 14 of the "Selsyn" transmitting device A. The rotor, or primary 14 is supplied with suitable power thorough conductors 15—16, and produces a flux along its magnetic axis (herein shown as the vertical axis) which in turn produces corresponding voltages in the stator windings 11—12—13. Through the conductors 11a—12a—13a, differential transformer D, and conductors 37—38—39 current is conveyed to the receiving control "Selsyn" device E at the terminals of its stator windings 40—41—42. The circuit is such that in the arrangement shown the magnetic axis of the stator of the receiver E is on a vertical plane as in the transmitter. The system is shown in the "neutral" or coincidence position, so that the rotor 43 of the receiver E has its magnetic axis 90° from the axis of its stator flux, consequently its induced voltage, and that impressed at terminals 46—47 (the input terminals of the motor control amplifier AA), is zero.

The rotor 43 of the receiver E is geared to the searchlight at the same ratio as the transmitter rotor 14 is geared to the telescope, so that when the motor M drives the searchlight, through shaft 56, gears 57—58, shaft 59, gears 60—61 and shaft 62, the rotor 43 is synchronously rotated at its proper ratio by shaft 59.

Now a disagreement between the magnetic axis of the rotor 43 and an axis of zero voltage in winding 43 (which corresponds to an axis 90° from the flux in the stator of receiver E produced by current in its coils 40—41—42) may be produced by either, any, or all of three different conditions:—movement of the telescope with consequent angular displacement of the transmitter rotor 14, angular movement of the rotor comprising the windings 31—32—33 of the differential transformer D, or by movement of the searchlight with consequent angular displacement of the rotor 43. The voltage resulting from such displacement is of such phase as to energize the motor M and cause it to drive the searchlight in a direction to cancel the angular displacement, or disagreement, between the telescope and the searchlight. This voltage must be of such magnitude as to drive the motor M (through the amplifier) at a speed corresponding to the angular velocity of the telescope movement.

The amplifier AA, which may be of the electron and/or gas tube type, or of tubeless nature, such as shown in my co-pending application Serial No. 101,529, filed September 18, 1936, or that shown in Patent 1,982,350, and is supplied with power at terminals 48—49, and has its output terminals 50—51—52—53 connected respectively, to the terminals of the field winding 54 and the brushes on the armature 55, is adapted to control the current through the armature 55 in proportion substantially to the input voltage at terminals 46—47. Since the amplifier specifically does not form a vital part of this disclosure, its details are omitted for the sake of clarity.

Suppose now that the corrective functioning of the differential device D and its driving torque motor C with associated rectifier B be for the moment neglected and assume the differential rotor to be locked in relation to its stator. Under this condition let the telescope be moved so as to produce disagreement between the zero axis of the flux in the stator of receiver E and the magnetic axis of the rotor 43. The resulting voltage in rotor winding 43 energizes the amplifier and consequently the motor drives the searchlight in a direction to cancel the disagreement. If the telescope is moved continuously at some definite angular velocity the motor will drive the telescope at a corresponding angular velocity, establishing a disagreement or lag between the telescope and searchlight of such magnitude as to furnish the correct amount of power from the amplifier to the motor.

Suppose that in a typical case this lag corresponds to 2° of angular difference between the neutral positions of transmitter rotor 14 and receiver rotor 43. Now this lag or disagreement may be neutralized, and the system constituting the searchlight will run in absolute agreement with the telescope, either by introduction of an effective angular advance of the flux in the receiver E or by the addition of a voltage in series with the rotor 43 corresponding to that induced therein by a disagreement of 2°.

In Fig. 1 the differential device D is adapted to introduce this angular advance in the following manner:

The differential transformer comprises two similar windings so arranged as to be rotated relative each other. The primary windings 31—32—33 are here shown on the rotor, while the corresponding secondary windings 34—35—36 are shown on the stator. (Practically it is of no consequence which winding, primary or secondary, is rotatably arranged in the device D, neither is it of any consequence in relation to the transmitter A and the receiver E.)

The differential transformer D is preferably mounted in a unit with the torque motor C—and has its rotor windings 31—32—33 directly connected to the rotor 25 of the torque motor through the shaft 26. A lever 27 attached to the shaft and to the spring 28, which is held by the adjustable anchors 29—30, so coacts with the spring as to hold the rotor assembly in a neutral position in the absence of a torque on the rotor 25. However, a torque on the rotor 25 results in angular displacement of the differential transformer primary and secondary windings of such magnitude as to permit the spring displacement to balance the torque of the torque motor C.

The torque motor C comprises an eddy current device in which the magnetic field is made to rotate in the stator synchronously with the rotation of the transmitter A and the telescope.

The bridge rectifier units 19—20—21 have their alternating current terminals connected together at points 19b—20b—21b and also connected through conductor 18 to one terminal of the secondary winding 17a of the "polarizing" transformer T. The opposite terminal of the secondary of transformer T through conductor 17 is connected to the mid point, or neutral point of the secondary stator windings 11—12—13 of the transmitter A. The opposite alternating current terminals 19a—20a—21a of the rectifiers 19—20—21 are connected to the outer terminals of the stator windings 13—12—11, respectively.

The direct current terminals of the rectifier units are connected to the stator windings 22—

23—24 of the torque motor in such directions that a net D. C. flux is produced in the device C which corresponds to the A. C. flux in the transmitter A.

The voltage introduced by the polarizing transformer T (the primary 17b of which is energized from conductors 15a—16a and the same source of power as applied to rotor 14), serves to so polarize the resultant A. C. voltages at the rectifier that the D. C. field in the device C rotates once for each rotation of the transmitter rotor 14. If the transformer T is removed, the system is still completely operable except that the D. C. field rotates twice for each revolution of the rotor 14. Moreover, the polarizing voltage introduced by transformer T assists in maintaining a uniform load on the separate "phases" of the transmitter by keeping the effective A. C. voltage across the rectifiers at a point which never quite reaches zero with consequent non-linearity of rectifier characteristics. To accomplish this the secondary voltage of transformer T is slightly greater than the maximum voltage in any one winding (11—12—13), so that the rectifier A. C. voltages go from maximum to minimum in sinusoidal form during rotation of rotor 14. Correspondingly the D. C. currents and consequently flux of the stator of device C agree as to voltage and direction of flux in the stator of the transmitter.

In my application Serial No. 705,633, filed January 6, 1934, which eventuated in Patent No. 2,048,082, dated July 21, 1936, I disclosed a system whereby angular positional relations could be obtained between an A. C. transmitter and a D. C. receiver without coercion existing in the transmitter as a result of receiver displacement though the torque of the receiver upon relative displacement was of appreciable magnitude. In that instance, however, the D. C. receiver had a "polarized" D. C. rotor. The system here utilized is similar except that the rotor 25 is not polarized but is of the squirrel cage type (or preferably of shell type without revolvable magnetic parts as shown in my copending application Serial No. 100,017, filed September 9, 1936) so that there is no sense of positional relation between transmitter and receiver rotors, but upon rotation of the transmitter rotor a corresponding rotation exists in the D. C. flux (stator) of the torque motor C which induces currents in the rotor 25. These eddy currents react upon the D. C. flux and tend to produce rotation of the rotor 25, but as before stated the lever 27 and its associated positioning spring prevent complete rotation.

The net result is that the rotor 25 and the rotor of the differential device D is moved through an angle proportional to the angular velocity of the transmitter and consequently the telescope.

It should be noted that although considerable torque is exerted upon the rotor 25 of the device C, no corresponding torque is present at the transmitter since for all positions and speeds the "loading" on each "phase" is identical. The device C therefore takes a constant, or substanially constant power from the transmitter. This power however is very small in the apparatus herein contemplated, being in a typical case of the order of 5 watts or even less than this amount.

Now that the functioning of the differential device D and its torque displacement motor has been explained, let the telescope be moved to establish disagreement with the searchlight. For continuous rotational movement of the telescope there exists a corresponding rotation of the D. C. flux in device C with consequent angular displacement of the rotor and stator of the differential device D.

Assuming that the tension of spring 28 is correctly adjusted, the drag on the rotor 25, by rotation of the field in its stator due to transmitter rotation, advances the flux in the stator of the receiver E by corresponding displacement of the rotor of the differential device D which is proportional to the angular velocity of the telescope. Consequently, although the disagreement between stator flux neutral axis and rotor magnetic axes in device E remains the same for a given velocity as it did with the rotor of differential device D locked, the corresponding angular advance introduced by the differential device D results in the searchlight running in absolute agreement with the telescope.

The angular correction for angular velocity which is introduced by device D and its associated torque motor and rectifier is proportional to both speed and direction, hence if the telescope is brought to rest, the "correction" becomes zero and both searchlight and telescope are in agreement.

In both Figures 1 and 2 the "Selsyn" type receiving device F has been illustrated, this device comprises the stator windings 64—65—66 connected to corresponding windings 11—12—13 of the transmitter and the rotor 67 which is energized through conductors 15a—16a from the same source of power that supplies rotor 14. The card indicator 69 with its pointer 69a driven from rotor 67 by shaft 68 serves to indicate the angular position of the transmitter rotor 14 in conventional manner.

The purpose of illustrating a separate receiving device F is to illustrate that my invention permits of angular correction for velocity lag only where specifically desired, therefore, the correction required by the follow-up controlling the searchlight will not affect the indication of other apparatus used simultaneously on the same transmitter.

Referring more particularly to Fig. 2 of the drawings, I have shown in diagrammatic form a follow-up control exactly similar to that shown in Fig. 1 except that the lag compensation is introduced as a voltage proportional to angular velocity instead of an angular advance in the data circuit between the telescope and the searchlight.

The transmitter stator windings 11—12—13 are connected through conductors 11a—12a—13a to corresponding points on the receiver stator windings 40—41—42.

For the purpose of illustration the device D has been shown as exactly similar in Fig. 2 to that of Fig. 1. In Fig. 2 however, the connections to the windings are so made that device D now simulates an induction regulator controller. The end terminals of coils 31 and 33 have been connected together and connected to the supply circuit for rotor 14 through the conductor 15b while the terminal of coil 32 has been so connected through conductor 16b.

This connection transforms the rotor of the device D into the primary of an induction regulator controller. The main magnetic axis being on the vertical axis, while the short circuit between the terminals of windings 31—33 causes these coils to simulate a "compensating" winding on the horizontal axis. The stator coils 34—36 are utilized as the secondary (having as shown in the diagram, which illustrates the regulator in the "neutral" or zero voltage position, a magnetic axis on the horizontal plane), and are so connected that the resulting secondary is in series with the rotor winding 43 and the input terminals 46—47 of the power amplifier.

Operation of the circuit of Fig. 2 is essentially similar to Fig. 1, except that upon rotation of the telescope the resulting angular displacement of the rotor of the device D causes the production of a voltage in the composite secondary formed by coils 34—36 which equals for any particular speed, the voltage required at the amplifier input terminals 46—47 to drive the motor M, and consequently the searchlight, at that speed.

Thus in the arrangement of Fig. 2 the actual disagreement between the zero axis of the flux of the receiver E and the magnetic axis of the rotor 43 may be zero, since the voltage supplied by the velocity displacement of the rotor and stator of device D provides the required operating voltage.

As in Fig. 1, the device F is unaffected by the velocity lag compensation introduced into the follow-up control system which controls the positional agreement of the searchlight to the telescope.

Although I have shown and described my invention in connection with searchlight azimuth control for the purpose of illustrating its utility, I do not intend that my invention be limited thereto inasmuch as it is applicable to the control of a gun from a remote position determining means, and for any instance where an object is to be controlled in agreement with a direction determining apparatus, or pilot device, by the utilization of induction angular positional transmitting and receiving device of "Selsyn" type.

I therefore desire that it be understood that no limitations upon my invention are intended except as may be imposed by the scope of the appended claims.

What I claim as new and desire to secure by Letters Patent of the United States is as follows:

1. A follow-up control for a pilot device and driven object comprising an electric motor for driving said object, means responsive to positional disagreement of said device and object for controlling said motor to drive said object toward correspondence with said pilot device at a velocity proportional to said disagreement comprising an electrical transmitting device connected to said pilot device, an electrical receiving device connected to said object and electrical connections between said transmitting and receiving devices, means for advancing the position of said object to eliminate disagreement comprising a differential device having an input member connected to said pilot device through said transmitting device and an output member connected to said receiving device, an eddy current motor having driving means connected to said pilot device and a driving member connected to activate a second input member of said differential device an amount proportional to the velocity of said pilot device.

2. Synchronizing apparatus for a pilot device and driven object comprising an electric motor for driving said object, apparatus for controlling the supply of power to said motor having an output circuit connected to said motor and an input control circuit, means responsive to positional disagreement of said device and object for energizing said apparatus to cause said motor to drive said object toward correspondence with said device at a velocity proportional to said disagreement comprising an electrical transmitting device connected to said pilot device, a receiver regulating device connected to said object and electrical connections between said transmitting and regulating devices, means for advancing the position of said object an amount substantially equal to said disagreement comprising a differential device interposed between said pilot device and said object, and an eddy current motor having a driving means connected to said pilot device and a driving member connected to an input member of said differential device.

3. A follow-up control system for a pilot device and driven object comprising an electric motor for driving said object, means for controlling the supply of power to said motor having an output circuit connected to said motor and an input control circuit, means responsive to positional disagreement of said pilot device and driven object for energizing said means to cause said motor to drive said object toward correspondence with said device at a velocity proportional to said disagreement comprising an electrical transmitting device connected to said pilot device, a receiver regulating device mechanically connected to said object and electrically connected to said control circuit and electrical connections between said transmitting and regulating devices, and a differential device having an input member actuated by an eddy current motor having driving means connected to said pilot device whereby said input member is actuated proportional to the velocity of said pilot device, said differential device being interposed between said pilot device and said object whereby the actuation of the first mentioned input member of said differential device results in the substantial elimination of positional disagreement between said pilot device and said object.

4. A follow-up control system for a pilot device and driven object comprising means for driving said object, means for actuating said driving means functional upon angular disagreement between said pilot device and said object, and means operative parallel with the last said means and functional upon the angular-velocity of said pilot device for actuating said driving means independent of said last said means.

5. A follow-up control system comprising a pilot device including a "Selsyn" data transmitter, a driven object, means for driving said object, means for controlling said driving means to drive said object toward a position of correspondence with said pilot device at a velocity proportional to positional disagreement of said pilot device and said object, and means responsive to the velocity of said pilot device for introducing a correction to cause said driving means to advance the position of said object an amount dependent upon said velocity, thereby to eliminate substantially said positional disagreement during movement of said pilot device, said controlling and said correcting means being independently connected between said pilot device and said means for driving said object.

ALGER S. RIGGS.